（12） United States Patent
Westphal et al.

(10) Patent No.: US 10,687,173 B2
(45) Date of Patent: Jun. 16, 2020

(54) SYSTEM AND METHOD FOR USING GEOGRAPHICAL LOCATIONS TO PROVIDE ACCESS TO PRODUCT INFORMATION

(71) Applicant: W.W. Grainger, Inc., Lake Forest, IL (US)

(72) Inventors: Geoffry A. Westphal, Evanston, IL (US); Mary Bee Pietrowicz, Mahomet, IL (US)

(73) Assignee: W.W. Grainger, Inc., Lake Forest, IL (US)

( * ) Notice: Subject to any disclaimer, the term of this patent is extended or adjusted under 35 U.S.C. 154(b) by 540 days.

(21) Appl. No.: 15/237,690

(22) Filed: Aug. 16, 2016

(65) Prior Publication Data

US 2017/0055112 A1 Feb. 23, 2017

Related U.S. Application Data

(60) Provisional application No. 62/206,012, filed on Aug. 17, 2015.

(51) Int. Cl.
*H04W 4/029* (2018.01)
*G06F 3/0482* (2013.01)

(52) U.S. Cl.
CPC .......... *H04W 4/029* (2018.02); *G06F 3/0482* (2013.01)

(58) Field of Classification Search
CPC .. H04W 4/02; G06F 3/0482; G06F 17/30241; G06F 17/30867
USPC ............................................ 455/456.1, 456.3
See application file for complete search history.

(56) References Cited

U.S. PATENT DOCUMENTS

| | | |
|---|---|---|
| 6,563,430 B1 | 5/2003 | Kemink et al. |
| 6,618,683 B1 | 9/2003 | Berstis |
| 7,315,830 B1 | 1/2008 | Wirtz et al. |
| 7,424,447 B2 | 9/2008 | Fuzell-Casey et al. |
| 7,668,754 B1 | 2/2010 | Bridgelall |
| 7,768,395 B2 | 8/2010 | Gold |
| 7,890,376 B2 | 2/2011 | Barrese et al. |
| 8,140,398 B1 | 3/2012 | Boesjes |
| 8,175,925 B1 | 5/2012 | Rouaix |
| 8,244,594 B2 | 8/2012 | Barron et al. |
| 8,341,029 B1 | 12/2012 | Ramalingam et al. |
| 8,355,961 B1 | 1/2013 | Ng et al. |
| 8,538,836 B1* | 9/2013 | Scott ..................... G06Q 30/06 705/27.1 |
| 8,600,835 B1 | 12/2013 | Lueck |
| 8,626,611 B2 | 1/2014 | Bravo |
| 2002/0065828 A1 | 5/2002 | Goodspeed |
| 2002/0095352 A1* | 7/2002 | Hitaka ................... G06Q 10/06 705/26.1 |
| 2004/0093274 A1 | 5/2004 | Vanska et al. |
| 2005/0246238 A1 | 11/2005 | Dvorak |
| 2007/0022021 A1 | 1/2007 | Walker et al. |
| 2007/0097929 A1* | 5/2007 | Dunko ................ G06F 17/3087 370/338 |

(Continued)

*Primary Examiner* — Anthony S Addy
*Assistant Examiner* — Farid Seyedvosoghi
(74) *Attorney, Agent, or Firm* — Greenberg Traurig, LLP

(57) ABSTRACT

A current geographic location of a mobile device, such as a smart phone, tablet computer, or the like, is used to customize a selection guide that is used to retrieve product related information. The product related information generally provides details about one or more products meeting one or more criteria specified via use of the customized selection guide.

15 Claims, 9 Drawing Sheets

(56) References Cited

U.S. PATENT DOCUMENTS

| | | |
|---|---|---|
| 2009/0287587 A1 | 11/2009 | Bloebaum et al. |
| 2010/0082447 A1 | 4/2010 | Lin et al. |
| 2010/0262554 A1* | 10/2010 | Elliott .................... G01C 21/20 |
| | | 705/323 |
| 2010/0299188 A1 | 11/2010 | Karnalkar et al. |
| 2011/0029370 A1 | 2/2011 | Roeding |
| 2011/0131084 A1 | 6/2011 | Shanahan |
| 2012/0123673 A1 | 5/2012 | Perks et al. |
| 2012/0259732 A1* | 10/2012 | Sasankan .............. G01S 5/0205 |
| | | 705/26.9 |
| 2013/0191246 A1 | 7/2013 | Calman et al. |

* cited by examiner

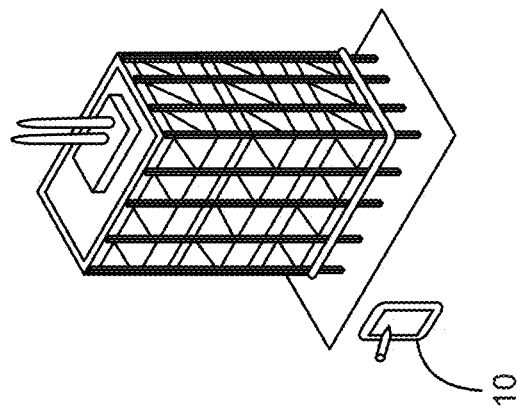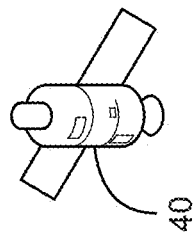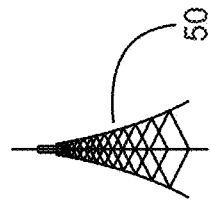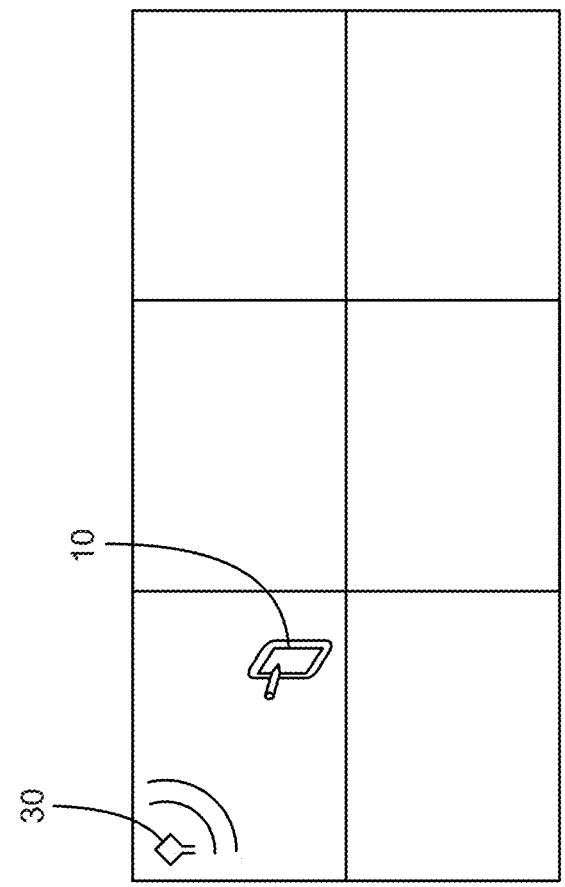
FIG. 2

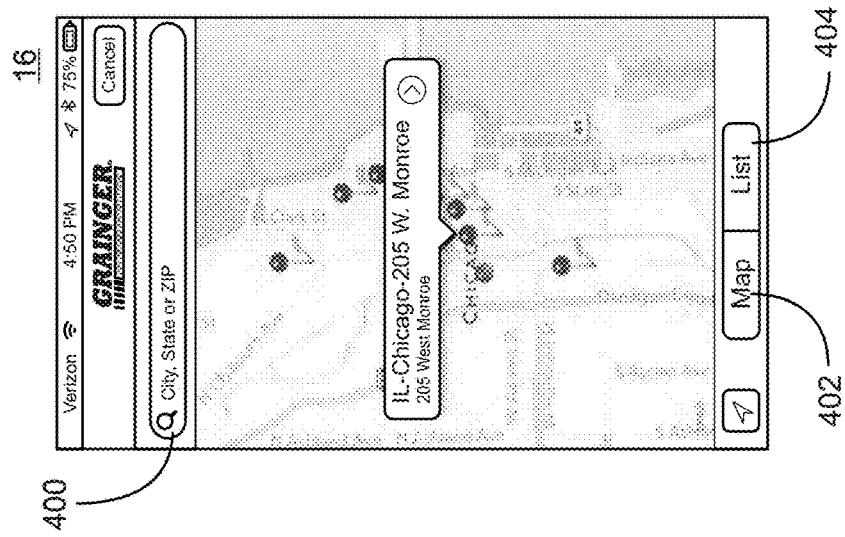
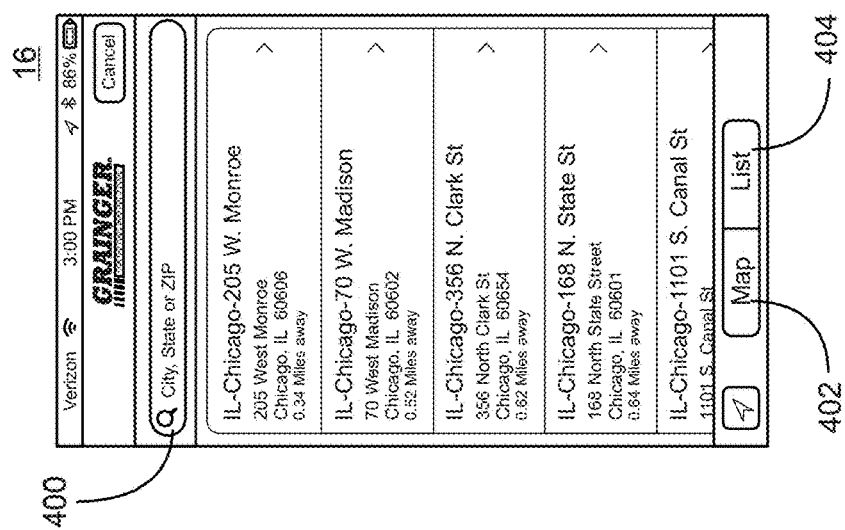
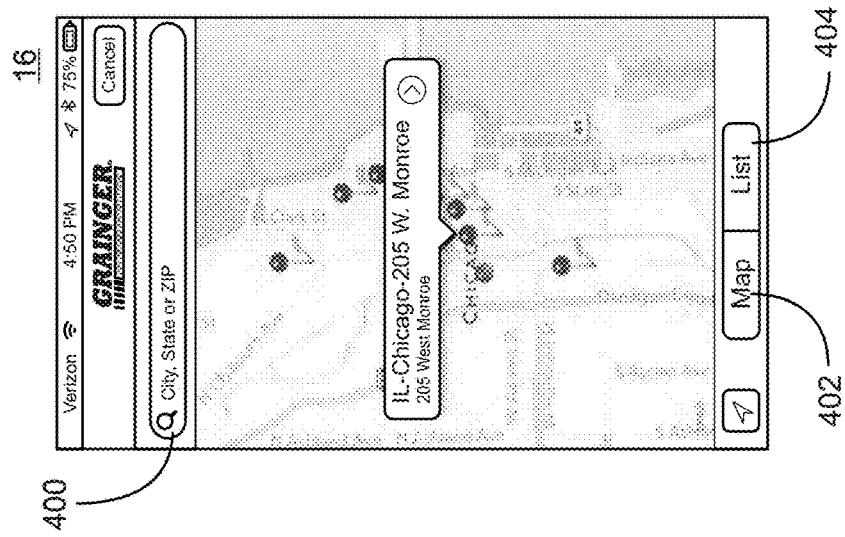
FIG. 5
FIG. 4
FIG. 3

FIG. 8
| Light ID | Lamp Name | Lamp Type ID | Volts ID | Watts ID | Base ID | Shape ID | Tech Type ID | Color ID | Manufacturer ID | Model | SN |
|---|---|---|---|---|---|---|---|---|---|---|---|
| 1 | Lamp1 | 1 | 3 | 4 | 10 | 1 | 1 | 1 | 1 | 1ABC | 12345 |
| 2 | Lamp2 | 1 | 3 | 5 | 20 | 1 | 2 | 3 | 1 | 2BCD | 23456 |
| 3 | Lamp3 | 2 | 5 | 5 | 30 | 6 | 3 | 2 | 1 | 3CDE | 34567 |
| ... | | | | | | | | | | | |
| 5000 | Lamp5000 | 4 | 9 | 7 | 100 | 20 | 1 | 4 | 4 | 4DEF | 98765 |
FIG. 9
| Type ID | Type Name | Description |
|---|---|---|
| 1 | Standard | ... |
| 2 | Candelabra | ... |
| 3 | Reflector | ... |
| ... | | |
FIG. 10
| Voltage ID | Voltage Range | Description |
|---|---|---|
| 1 | 1-2-9 | ... |
| 2 | 3-5-9 | ... |
| ... | | |
| | 201-300 | ... |
FIG. 11
| Wattage ID | Wattage Range | Description |
|---|---|---|
| 1 | | |
| 2 | | |
| 3 | | |
| ... | | |
FIG. 12
| Lamp Base ID | Style | Description |
|---|---|---|
| 1 | 2-Pin(G23-2) |  |
| 2 | 2-Pin(G12) |  |
| 3 | 2-Pin(G23) |  |
| ... | | |

| Shape ID | Shape Name | Description |
|---|---|---|
| 1 | Pear | |
| 2 | Spiral | |
| 3 | Globe | |
| ... | ... | |

FIG. 13

| Tech Type ID | Tech Type Name | Description |
|---|---|---|
| 1 | CFL | Efficient, bright, low-heat... |
| 2 | Fluorescent | Efficient, bright, low-heat... |
| 3 | HID | Dimmable, warm, long-life... |
| ... | | |

FIG. 14

| Color ID | Color Name | Other Description Fields |
|---|---|---|
| 1 | Bright White/Daylight/Natural | 4501-6800K |
| 2 | Cool White/Neutral | 3101-4500K |
| 3 | Northlight/Blue Sky | 6801K+ |
| 4 | Warm White/Soft White | 1900-3100K |

FIG. 15

| Manufacturer ID | Manufacturer Name | Other Descriptive Fields |
|---|---|---|
| 1 | General Electric | Contact Info. Address, Email, Etc. |
| 2 | Aero-Tech | ... |
| 3 | Phillips | ... |
| ... | ... | ... |

FIG. 16

| Location ID | Location Name | Other Descriptive Fields |
|---|---|---|
| 1 | Building 1 | Lat-Long, address, or other info |
| 2 | Building 2 | ... |
| 3 | Building 3 | ... |
| 4 | Building 4 | ... |

FIG. 17

| Beacon ID | Beacon Name | Other Descriptive Fields |
|---|---|---|
| 1 | General Electric | Contact Info. Address, Email, Etc. |
| 2 | Aero-Tech | ... |
| 3 | Philips | ... |
| ... | ... | ... |

FIG. 18

| Beacon Location Map ID | Beacon ID | Location ID | Other Description |
|---|---|---|---|
| 1 | 1 | Lat-Long, address, or other info | Beacon Purpose, Picture, etc. |
| 2 | 2 | ... | |
| 3 | 3 | ... | |
| ... | ... | ... | |

FIG. 19

| Lighting Beacon Map ID | Beacon ID | Lighting ID | Other Descriptive Fields |
|---|---|---|---|
| 1 | 1 | 2 | Contact Info, Address, Email, Etc. |
| 2 | 1 | 5 | ... |
| 3 | 1 | 106 | ... |
| ... | ... | ... | ... |
| 25 | 1 | 2045 | ... |
| 26 | 2 | 3 | ... |
| 27 | 2 | 9 | ... |
| 28 | 2 | 400 | ... |
| ... | ... | ... | ... |
| 74 | 2 | 1055 | ... |
| 75 | 3 | 10 | ... |
| ... | ... | ... | ... |

FIG. 20

What Type of Lamp Are You Looking For?
Select one from below to help us find the right light for you.
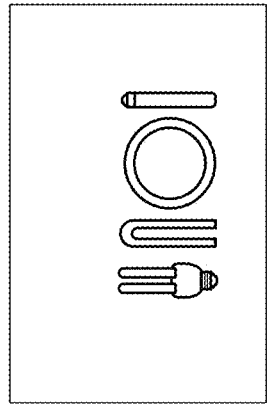
What Shape is the Lamp You're Looking For?
Select from the choices below.
Straight (linear)
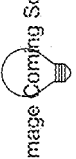
Image Coming Soon
Need Help?
FIG. 22

SYSTEM AND METHOD FOR USING GEOGRAPHICAL LOCATIONS TO PROVIDE ACCESS TO PRODUCT INFORMATION

RELATED APPLICATION INFORMATION

This application claims the benefit of U.S. Application No. 62/206,012, filed on Aug. 17, 2015, the disclosure of which is incorporated herein by reference in its entirety.

The subject matter within this disclose is also related to the subject matter disclosed in commonly assigned, U.S. application Ser. No. 13/796,517, filed on Mar. 12, 2013, the disclosure of which is incorporated herein by reference in its entirety.

BACKGROUND

Product selection guides are useful, general search tools that allow a user to perform a navigational search. More particularly, a selection guide allows a user to search for a product by iteratively selecting a parameter where each selection causes search results to be reduced by filtering out products whose characteristics do not match the selected parameter(s) while, at the same time, presenting a corresponding reduced set of parameters with which the next search parameter(s) can be selected. Typically, this approach assumes that the customer is searching within an entire line of products, e.g., fasteners or light bulbs, that are stored in a database using a predefined hierarchical structure or taxonomy.

Another common web search paradigm, called direct search, allows users to search for products by entering a list of keywords into the search interface, and the search results will display all products which are associated with one or more of the entered keywords. The two paradigms—navigational search and direct search—can be combined to form a third search paradigm called faceted search. This paradigm allows search along multiple dimensions, with a narrowing of scope along each dimension. This approach has become popular in ecommerce and library applications.

It has been seen, however, that these basic search paradigms by themselves are inefficient because they are not inherently personalized to the user or the user's current purpose or role in an enterprise. As a result, these basic search paradigms make it hard for customers to find what they need as the search results often present products that are irrelevant to the customer. For example, a search query may cause a 50 Hz motor to be provided in a search result when the customer's site is only wired for 60 Hz electricity. Accordingly, a need exists for a search paradigm that takes the customer context into consideration, particularly the physical context, to thereby do a better job of helping customers find what they need.

SUMMARY

The following describes a system and method that uses a current geographic location of a mobile device, such as a smart phone, tablet computer, or the like, to retrieve lists of and/or to facilitate the searching for one or more products, product related services, and/or other product related information (such as images, notes, inventory, etc.) (individually and collectively referred to herein as "items") using information that generally pertains to the current geographic location. The retrieved lists/search results provide details about the items and preferably include a user interface element for allowing, among other things, items to be ordered, e.g., for delivery/shipment to the current geographic location, to another geographic location, and/or for pickup at a given location.

A better understanding of the objects, advantages, features, properties and relationships of the systems and methods described hereinafter will be obtained from the following detailed description and accompanying drawings which set forth illustrative embodiments.

BRIEF DESCRIPTION OF THE DRAWINGS

For a better understanding of the system and method for associating item lists with geographical locations described hereinafter reference may be had to preferred embodiments shown in the following drawings in which:

FIG. 2 illustrates exemplary methods for obtaining geographic location information for use in the system of FIG. 1;

FIGS. 3-7 illustrate screen shots of exemplary user interfaces presented by the system of FIG. 1;

FIG. 8 illustrates a data table storing information for lamp products;

FIG. 9 illustrates a data table storing lamp type information;

FIG. 10 illustrates a data table storing lamp voltage information;

FIG. 11 illustrates a data table storing lamp wattage information;

FIG. 12 illustrates a data table storing lamp base type information;

FIG. 13 illustrates a data table storing lamp shape information;

FIG. 14 illustrates a data table storing lamp technology type information;

FIG. 15 illustrates a data table storing lamp color information;

FIG. 16 illustrates a data table storing lamp brand or manufacturer information;

FIG. 17 illustrates a data table storing location related information;

FIG. 18 illustrates a data table storing beacon related information;

FIG. 19 illustrates a data table storing beacon-location mapping information;

FIG. 20 illustrates a data table storing beacon-lighting mapping information which links lighting products to beacons and which includes any additional information that might be desired to be kept about the relationship;

FIG. 22 illustrates a portion of a geo-aware selection guide.

DETAILED DESCRIPTION

With reference to the figures, exemplary systems and methods for associating one or more item lists with a geographical location are now described.

Figure 1:
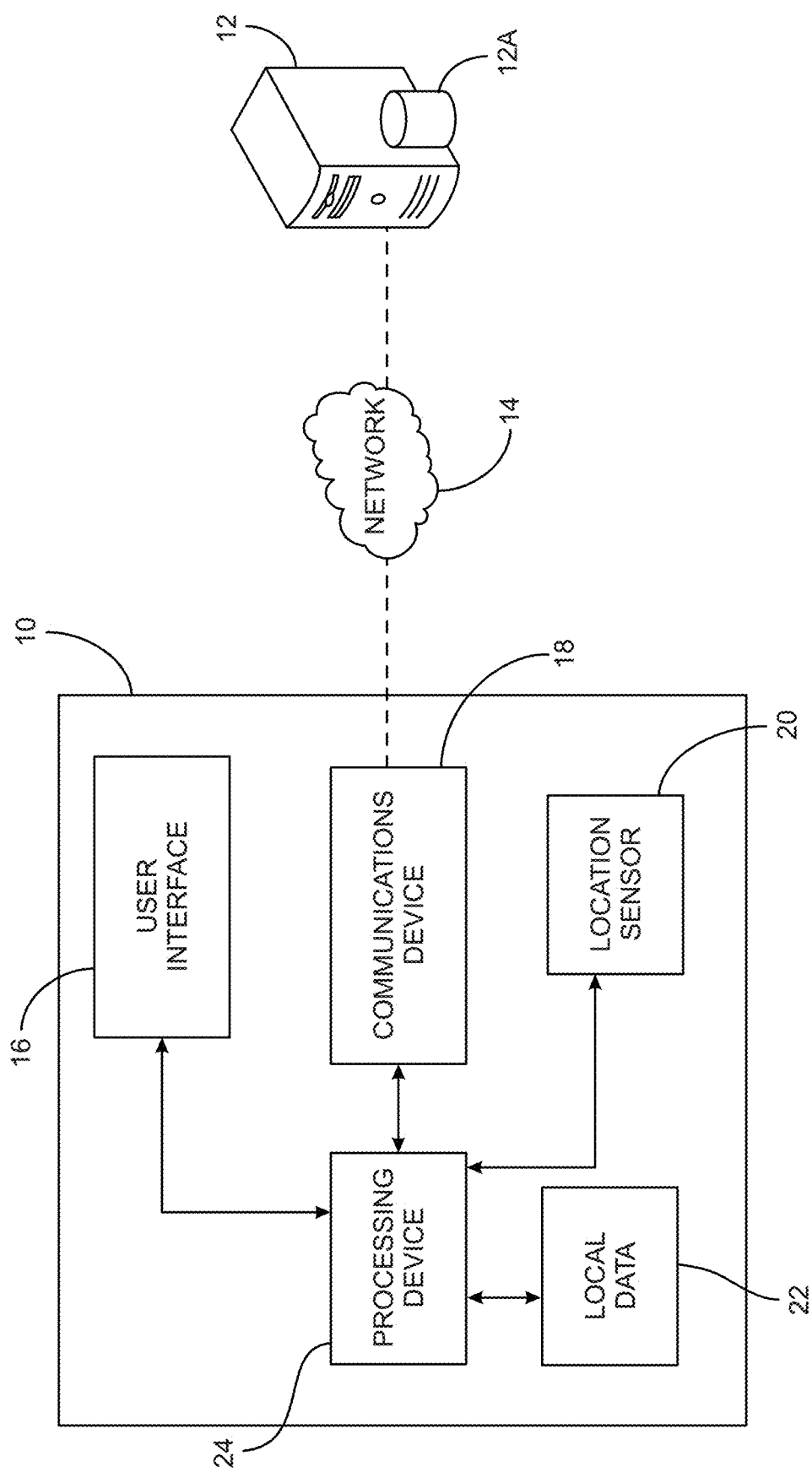
FIG. 1 illustrates a block diagram on an exemplary mobile device in an exemplary system in which item lists are associated with geographical locations.

FIG. 1 illustrates a block diagram of an exemplary system for associating one or more item lists with a geographical location. As will be described in greater detail hereinafter, the system includes a mobile device 10, such as a smart phone, tablet computing device, or the like, which may communicate, as necessary, with a server device 12, having an associated data repository 12A. Communications between the mobile device 10 and server device 12 may be made via a network 14, such as a local area network and/or a wide area network. As further illustrated in FIG. 1, the mobile device 10 preferably includes components that are conventionally included in a mobile computing device such as, by way of example only, a user interface component 16 (e.g., a touch screen display), a communications device 18 (e.g., RF, IR, and/or other protocol type receiver, transmitter, and/or transceiver), a location sensing device 20, a local data store 22 (e.g., RAM, ROM, and/or other physically embodied memory devices/computer-readable memory) having stored thereon data, processor executable instructions (e.g., apps), and/or the like, and a processing device 24 to control the operations of the various elements. Generally, the location sensing device 20 provides a location parameter to the processing device 24 and the processing device 24 initiates a retrieval of information that has been associated with the location parameter from the data repository 12A via the server 12 for display in the user interface 16. The location parameter may be an absolute location coordinate, such as a latitude and longitude, a relative location, such as within the vicinity of a known location coordinate, and/or a descriptive location, such as the name of a location. Within the local data store 22 and/or the remote data store 12A such location parameters will be cross-referenced to the information that is to be retrieved therefrom. It will be additionally appreciated that this description is not intended to be limiting. For example it will be understood that the mobile device 10 may also include a subset of above-described components, e.g., a display, location sensing device, a processing device, and a transceiver, with the mobile device 10 then being adapted to use information and/or programs stored on other devices, such as in a cloud computing environment. An exemplary mobile device 10 may therefore also be a pair of "Google" brand glasses.

FIG. 2 illustrates an example implementation of a system for associating lists of items with a geographical location. In the illustrative example, as a mobile device 10 is carried by a user, various means may be used to determine the location of the mobile device 10. In one example, as the user enters a room or other defined area within a building, e.g., a boiler room, the location sensing device 20 detects an emission from one or more emitters 30 that are disposed in the vicinity of the room. The detection of the emission from the emitter(s) 30 may be automatic or the detection may be made in response to a user interaction with the mobile device 10, for example by the user activating the "my lists" link 300 in the "Grainger" app that is being executed on mobile device 10 as illustrated in FIG. 3. In any case, when the emission from the emitter(s) 30 is detected, the location sensing device 20 in the mobile device 10 notifies the processing device 24 in the mobile device 10 that it is in the vicinity of one or more of the emitters 30 that are associated with the room and the processing device 24 in the mobile device can then issue a query, using data received from the emitter(s) 30, such as an emitter identifier number or the like, or data that is otherwise cross-referenced to data received from the emitter(s) 30, to one or both of the information sources 12A, 22 for the purpose of retrieving one or more lists that are associated with the room, e.g., one or more lists that have been cross-referenced to the data that is representative of the room.

Figure 6:
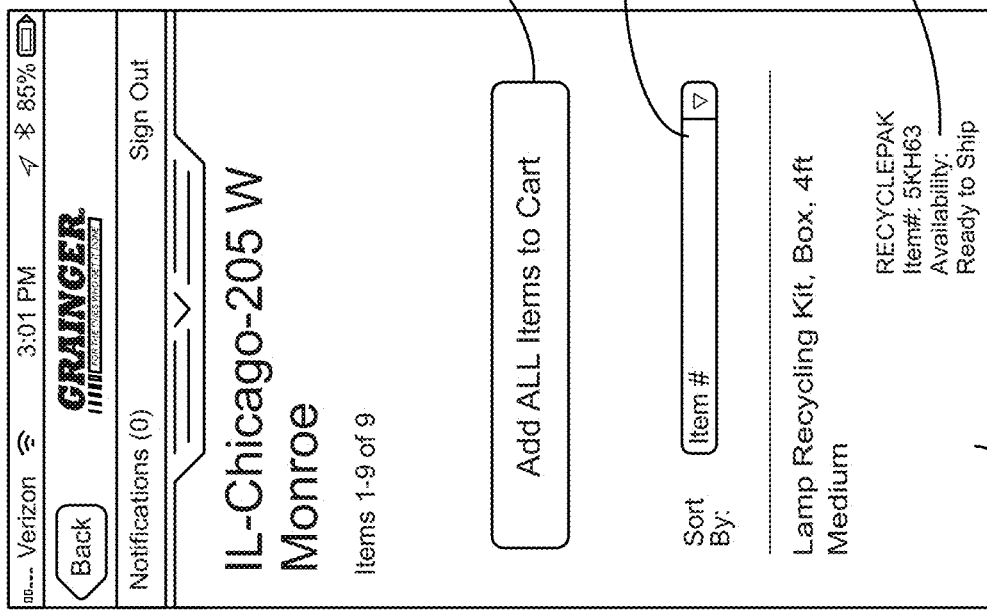

In keeping with this example, the information sources 12A and/or 22 may provide a listing of product that has been installed in the present location of the device 10, a listing of product that has been previously purchased for use in the present location of the device 10, a listing of parts for product that has been installed in or purchased for use in the present location of the device 10, a listing of product that has been manually assigned to the current location of the device 10, a listing of product that has been delivered to/shipped to the present location of the device 10, etc. In any case, the information provided, e.g., the listing of product, parts or the like, will be crossed-referenced within the database to data that is indicative of the location, such as a latitude/longitude, an emitter identifier, etc. As shown in FIG. 6, a listing of product may further include one or more pictures 600 of one or more products, textual item descriptors 602, one or more pictures of one or more products as installed in the location, links 606 for use in purchasing product, e.g., to add individual product or all listed product to a shopping cart, links to other information related to the product and/or location (links to further pictures, data sheets, installation instructions, and other content as desired), links for accessing product availability/inventory information, links for accessing shipping and/or pickup information, links for accessing branch information, links and/or fields for allowing a user to add notes to the list, etc. Any such retrieved information will be displayed in the user interface 16 and user interface elements 604 may be additionally provided to allow a user to sort or otherwise filter lists as desired. Any information captured from the user while viewing a displayed list may be uploaded to and stored in the data repository in association with the relevant list. Likewise, any information captured from the user while in the current location may be uploaded to and stored in the data repository in association with, i.e., cross-referenced to, the identifier for the current location.

As noted above, the lists may be manually created, e.g., a user can manually associate geographical location information (whether absolute, relative, or manually provided) with one or more products and/or product related content. The lists may also be automatically created, e.g., geographical location information can be captured by a mobile device when an order for product is placed and the product can thereafter be included in a list that is associated with the captured geographical location information. Lists may also be automatically created using ship to or deliver to information and the like without limitation. Information that is included in the lists or otherwise accessible via use of the lists can be user provided information (e.g., information uploaded to the server 12 and/or locally stored on mobile device 10) and/or vendor provided information as desired.

In addition to providing direct accesses to the aforementioned one or more lists, it is contemplated that mobile device can use the location information as obtained from the emitter(s) 30 to provide a user with access to a floor plan diagram or like. In this manner, a user can interact with the floor plan diagram, e.g., via the touch screen or graphical display, to access one or more lists associated with a user specified location, e.g., a specified room in a facility. In further circumstances, the location parameter may also include data indicative of an orientation or pointing direction of the mobile device 10, so that, for example, as a user pans around a room subsets of lists associated with that room may be provided to the user in user interface 16, e.g., product included in a circuit breaker box can be shown when the mobile device is oriented to face a first wall of a room and product included in a water closet can be shown when the mobile device is oriented to face a second wall of the room. In any event, it is to be understood that the techniques that are used for presenting text, drawings, images, and associated options in the user interface 16 are common to one of ordinary skill in the art, and include for example, the use of hypertext markup language, HTML, that is used to display pages of information with links to other information or processes.

As concerns orientation/direction of pointing determination, various technologies (used alone or in combination) are contemplated. For example, the most common direction sensor is the compass, which is a magnetometer that senses where the strongest magnetic force is coming from. This is usually magnetic north. Acceleration methods are rarely used by themselves to detect orientation, but are frequently combined with other sensor data. 3D accelerometers can identify the "down" direction by detecting the pull of gravity (9.8 m/s**2). Given grounding of the "down" direction, and an initial frame of reference for orientation, integrating (summing) once over the acceleration data will produce a velocity. This method (a type of "dead reckoning") is impractical by itself because summing also magnifies error in the acceleration measurements in a relatively short period of time. Rotational (angular) acceleration measurements are useful for detecting turns, but they are error-prone as well, without any other data to provide periodic correction or location sensing. One way of dealing with the error accumulation is to place the sensor on a person's shoe. When it touches the ground, the inferred acceleration is set to zero, which zeroes out error accumulation. Accordingly, the system may use acceleration+magnetic measurements, acceleration+wifi location tracking+maps, and the like. Magnetic measurements combined with 3D accelerometer data can provide good 3D direction sensing.

Still further, the analysis of 3D accelerometer data can identify the "down" direction by detecting the pull of gravity, which provides a consistent rate of acceleration, and the measured acceleration (with gravity subtracted) in each direction. Then, the system can calculate the net acceleration (and angular acceleration for detecting turns), by subtracting gravity. Then, other measurements can be combined (such as wifi location sensing, maps of the space showing the possible paths of travel, and the historical trajectory) with accelerometer data to estimate spatial orientation.

It is also contemplated that the system can use sonic location tracking methods to provide direction sensing as well. The mobile system can emit one or more directed streams of vibrations at sub or supersonic frequencies (use different frequencies if multiple vibration streams are emitted), and the system can measure the signal strength from multiple microphones in the space in the frequency bands corresponding to the vibrations emitted by the mobile device. Given placement of microphones which are most sensitive in a given direction (i.e., not omni-directional microphones), and the location of the mobile device, the system can determine the orientation of the device by the strength of the signals at different frequencies measured at the different microphones.

Yet further, the system can use direction of arrival methods in which the system determines the direction a signal (such as a sound or radio wave) arrives at a location equipped with an array of sensors. This is often combined with a beamforming technique, which is used to estimate the signal from a given direction. Using these techniques, the system can estimate the direction where the signal (usually sound) originates, relative to the sensor array.

Still further, various statistical methods can be used to determine the probability of an object being in a particular location, with a particular orientation. One common method uses the Kalman Filter, which estimates a current signal value based on another measurement, and the previous estimated signal value. The technique basically says that the estimated value of a signal that cannot be measured depends on a related value which can be measured, and the previously estimated values of that signal. As a conceptual example, the probability that you will be travelling in the same direction as you were a second ago is usually high, that is, higher than the probability that you will be travelling in the opposite direction as you were a second ago. Because the system may not be able to measure location and direction directly, the system can use sensor measurements such as signal strength, magnetic direction, acceleration, etc. This method also assumes that process noise and measurement noise are elements of the model of the signal. Many references describe modeling problems as Kalman Filters and many variations on this basic model are possible.

It will also be appreciated that the lists presented to the user may be dependent upon other external parameters, such as the time of day, the time of the year, and the like. For example, a list of product for a discerned location may be seasonally adjusted, adjusted based on product availability, etc. Similarly, the lists presented may be based upon a current user of the mobile device. For example, a list of product for a location may be role adjusted (e.g., one list for a user having the roll of an enterprise plumber and one list for another user having the roll of an enterprise electrician). Methods for discerning a user of a mobile device, and accordingly their role to the extent such information has been associated with the user within a database, such as log-in methods, biometric methods, etc. are known in the art and need not be described herein for the sake of brevity.

As further illustrated in FIG. 2, a mobile device 10 may additionally (or alternatively) obtain geographic location information via use of a GPS satellite system 40, cellular phone system 50, or the like without limitation. Furthermore, the user may be provided the option of entering the location parameter directly, thereby eliminating the need for beacons in all or some of the locations. For example, the user interface 16 may provide a "location" option, wherein the user enters a location, selects from among a predefined list of named locations, etc. Alternatively, or in addition, the mobile device 10 could contain a voice recognition device, and the user could say the name of a location, such as "boiler room," "Plant A," etc., that will be used by the mobile device 10 to determine the location parameter. The location sensing system could also contain a relative location sensing device such as accelerometer that is used to determine the movements of the mobile device 10 relative to a predefined reference point, such as the location of building entranceway. In such an embodiment, the mobile device 10 determines the location parameter based on movements relative to the reference point. These and other techniques for determining or defining a location parameter and associating it with a physical area or region are common to one of ordinary skill in the art.

FIG. 4 illustrates an example in which a user is presented with a plurality of lists from which the user can select a particular list of interest for display as described above. In the illustrated example, the plurality of lists are sorted and displayed based on a current geographical location of the mobile device 10, e.g., in a descending order from closest to furthest considering the current location of the mobile device 10. In further circumstances, the lists to be included in the presented plurality of lists can be limited to a given number, limited to only those lists within a given distance from the current location of the mobile device 10, e.g., within 50 miles, and the like. It will be appreciated that given locations may also provide access to multiple lists (e.g. 500 W Madison could have sub lists for $16^{th}$ floor, $15^{th}$ floor or by Lighting, Electrical, etc.) A user interface element 400 can be provided to allow for location based searching and user interface elements 402 and 404 can be provided to allow the user to toggle between a list view as shown in FIG. 4 and a map view as shown in FIG. 5. In the map view of FIG. 5, wherein the map is preferably centered on the current location of the mobile device 10, a user can likewise interact with a displayed location, e.g., clicking on a pin placed on the map, to access the one or more lists associated with that location as described above.

Figure 7:
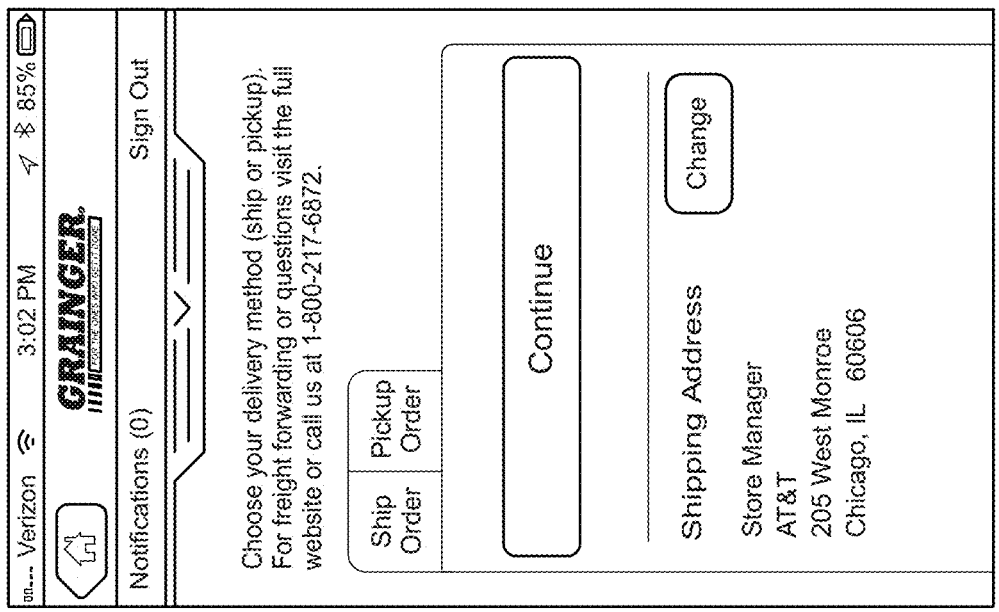

FIG. 7 illustrates an example in which a geographical attribute associated with a list, particularly a product in a list, is automatically applied to another system action. For example, in response to the user adding the "lamp recycling kit" as shown in FIG. 6 to a shopping cart, the geographical location associated with the list which includes the "lamp recycling kit" is used to automatically populate the shipping address as shown in FIG. 7. It is similarly contemplated that the user's current geographical location could be used to automatically populate a shipping address or to select a pick up branch location, preferably one having stock in inventory, that is closest to the user's current geographical location. Preferably user interface elements are provided to allow the user to verify and/or edit any such automatically applied actions.

In a further described embodiment, a customer/user selection-guide context can be created by using location information to help locate the products (or preferred selection options) that have an association with the location. The system retains mappings between beacon IDs and/or the geo-coordinates of the beacon, using one of the many popular techniques to determine location (see the options for location technologies below). The system also supports supplemental location information in the form of metadata, for example, something like "assembly line A," or whatever is convenient to the user and the system. In this regard, it is contemplated that products (or selection options) contain metadata which tell the system which beacons or geographical locations they are associated with. Then, when the user enters a beacon's range, the system's interface presents products which are associated with that beacon, and suppresses presentation of products and options which are not associated with that physical location. Products which are not associated with a given geographical location, for example, may appear grayed-out and be rendered un-selectable, or they might not appear at all on the screen. The user can override this usually helpful default behavior when necessary, and view all of the choices. If the user asks to see products which are not associated with that physical location, and then purchases one of these "out-of-bounds" products, the system learns that a new product should be associated with that beacon, with a certain level of probability. If users purchase this out-of-bounds product again, the system increases the probability that the product is associated with a given location. When the probability of the association increases above a predetermined threshold, and when the required approvals (if any) have been obtained, the system learns that the new product should be associated with the given location, and presents it to the user, along with the other products which are associated with this location. This is a form of "active learning," which keeps the user in the loop, and allows the system to self-correct and adapt to changes.

The system can also un-learn associations as needed. For example, if a product has not been purchased within a given amount of time, the probability that the product is associated with a given location decreases. When the probability of association drops below a given threshold, the system can disassociate a product with a location. Note that the product "drop/add" approval process can be automated as well.

The system can also automatically start a location-aware application when the user enters a geographical area that the application knows about (automatic location-aware application execution, or ALAAE). With this capability, a user could walk around a facility, and the applications corresponding to the current location could run and display the products or other choices associated with the user's current location. Users can decline the ALAAE and choose manual application execution, as well.

It is also possible to customize the UI to specific user interaction modalities. The standard desktop interface is preferred to be omnipresent, but hands-free voice interaction could also be useful, and in some cases, a preferred modality. Similarity search via visual example (a picture of what you want), or sonic example (a recording of what the object sounds like) are helpful and convenient when the user is unable to remember the name of the desired object, or when it is just convenient to point a camera at the thing you want.

For discerning the location of the user/mobile device, numerous technologies, including RFID, Bluetooth Beacons, GPS, 802.11 Wifi, Infrared (IR), and Indoor GPS are contemplated.

Many possibilities exist for incorporating RFID into beacon technology. Passive and active RFID technology can be used for location tracking. RFID systems consist of tags which transmit their IDs to a nearby base station. Therefore, depending on the type of RFID deployed, the number and placement of the receivers, the signal strength at the receiver, the RFID frequency, the kinds of antennas incorporated into the tags and receivers, the range of the specific RFID technology, and environmental interference (such as the nearby presence of metal or water), location estimates can be made based on which receivers detect the presence of a tag, and the signal strength at each receiver. If a single receiver detects a tag, then the system can assume presence of an entity within the radius of the detection range, and further limited to the probable radius corresponding to the signal strength. Otherwise, if multiple receivers detect the signal, the system can triangulate and determine a more accurate location.

Multiple types of RFID exist (active, passive, and blended). In active RFID, the tags have power, usually batteries on board, and the tags periodically transmit. Passive ID tags, in contrast, are not powered until they enter the range of their corresponding receiver. The receiver generates a magnetic field which powers the RFID tags by induction, enabling the RFID tag to transmit a message to the receiver containing at a minimum, the identity of the RFID tag. Blended systems use a combination of the two types of technologies. Passive RFID is by far the most common option.

RFID tags generally operate at a variety of frequencies, including LF (125 Hz), HF (13.56 MHz), UHF (433 MHz, 860-960 MHz), and Microwave (2.45, 5.8 GHz). Band restrictions typically vary by country. These different bands have different properties, including range, and the ability of the signal to travel through water (note that human bodies are largely water, and therefore can block signals in some ranges). Note that metal is hostile to all RFID systems, and should not be present in close proximity to the RFID readers or tags. Also note that the microwave RFID band overlaps the band used for 802.11 (2.4 GHz band), and the two technologies could interfere with each other.

The most common way to deploy an RFID system is to have the readers deployed in fixed locations, with tags attached to people or mobile objects. In this case, the system estimates the location of tagged objects based on signal strength and the location(s) of the reader(s) that detected the object. Alternatively, the tags can be deployed at fixed locations in the environment, and a person (or mobile object) moves about the space. In this case, the system estimates the location of the mobile object based on the location of the tag which most recently transmitted its ID.

Bluetooth beacons typically operate via Bluetooth 4.0 (aka Bluetooth Low Energy), and detect the proximity of close-by Bluetooth app-enabled devices, such as smart phones. When a beacon detects a device that has the appropriate app installed on it, and the device user has enabled location services on the app and opted in for receiving content, the beacon system can send location-specific content to the user. Such a beacon-app pairing could deliver product notifications to customers who are physically close to the product in a store.

Beacon systems typically have three parts. The hardware beacon continuously broadcasts a message containing its unique ID (UUID), and two other categorical IDs (called a "major" and a "minor"). Typically, this hardware beacon is installed at a fixed location in a building, but it could just as easily be installed on a moving object or given to a person to carry. Next, the mobile device application (functioning as listener) searches for beacons with specific UUIDs, major IDs, and minor IDs, and accepts notifications when the device carrying the app gets within range of the beacon. Optionally, the mobile device application (functioning as beacon) can be a mobile beacon.

Bluetooth operates in the 2.4 GHz band and therefore has the potential to interfere with 802.11, but the Bluetooth spec mitigates this using adaptive frequency hopping (AFH) to minimize interference.

The range is application dependent and is not limited by the Bluetooth specification. Typically, devices fall into implementation classes with different ranges, including class 1 (300 ft), class 2 (33 ft, and the most common class), and class 3 (3 feet).

Users carrying a device enabled with a Bluetooth 4.0 app will track which beacon(s) they are in range of, and, as long as they are in range of the particular beacon, they will receive content which is suitable for their location.

The GPS location tracking technology uses a satellite network and requires line-of-sight between the tracking device and the satellites. Typically, GPS will not work indoors because buildings and ceilings block line-of-sight. GPS also has difficulty outdoors in large cities (because tall buildings block line-of-sight), and in dense, tall, ground-cover (because again, objects block line-of-sight).

GPS technology is based on time, and the satellites have built-in, extremely accurate atomic clocks which are synchronized with "true time" kept by ground clocks. A GPS device must acquire 4 satellites, and then it determines its location by solving for 4 system variables: 3 position coordinates and the clock deviation from satellite time. Given origin at the center of the earth, the satellites each transmit their (x, y, z) position coordinates, and the transmission time of the message, according to the satellite's clock. The device can then determine its location by calculating the distance from each of the satellites to the device, taking into account the time drift between the on-board device clock and the accurate GPS system clock, and using algebraic or numerical methods.

When both outdoor and indoor positioning are required, GPS can be combined with other location tracking methods. And, GPS can fail over to one of the other tracking methods when a device is indoors.

GPS is becoming ubiquitous, because most cell phones and mobile devices come equipped with a GPS receiver.

802.11 wireless networking relies on routers to send data between computer networks. These routers communicate with wireless access points (APs) which allow the wireless devices to connect to a wired network. Routers can also incorporate their own AP within the product.

Typical APs can talk to about 30 clients within a radius of about 100 meters, but the actual range depends on whether the AP is inside or outside, and whether the environment has barriers such as walls, trees, buildings, or other signal reflecting and absorbing surfaces.

Location tracking by 802.11 Wifi works by analyzing the received signal strength (RSSI) of the signals from the APs in range. If a device can see multiple APs, it can triangulate. Given a well designed network of APs in a building, and a reasonable amount of reflective/absorbing surfaces (such as walls), an average accuracy to approximately a 15-20' square room is expected, although it is possible to do even better.

IR technology is light which is at a longer wavelength (lower frequency) than the human eye can see. It requires line-of-sight contact between the transmitting and receiving device, and is typically modulated at 38 kHz for transmission. It also has a very low average error rate. The receiver demodulates the signal and transforms it into a serial bit stream. The IR range depends on implementation, especially power levels, and typically ranges from about 0.2 m to several meters. The Infrared Data Association (IrDA) provides specifications that govern IR communication.

A low-technology solution to location tracking is the use of barcodes. It requires 1) installation of a set of barcode readers in strategic, known locations, and 2) presentation of the tracked tag to the reader (as is currently done when tracking inventory down a conveyer belt, or at a price-check station in a retail store). The system can know that an asset was at a specific location at a specific time, and can observe previous trajectory, and even predict future trajectory based on analysis of prior data, and heuristics.

Cameras in an environment with detection software can identify people and objects and place them in the context of their sensed range, particularly when the system has a map of the space. Cameras are often used with other sensing modalities to detect presence, identity, and location of people or other entities. Cameras and microphones, cameras/accelerometers/compass, and cameras with RFID are examples of multiple sensing modalities which use cameras.

The system can locate mobile objects via sound, as well. The mobile system can emit vibrations at sub or supersonic frequencies, and microphones in the environment can record data at those frequencies. Given proper placement of the microphones in a space, the system can triangulate and determine location by signal strength. These methods may have to compensate for noisy environments, to subtract out any background noise in that frequency band.

Systems using blended technologies are also contemplated. For example, an active RFID tag could transmit its information according to the 802.11 spec, and a thin layer of Access Point (AP) resident software could capture the RSSI (received signal strength) associated with the tag, and a timestamp, and forward that data along to a central server for processing. When a single AP sees the RSSI at a given time, you can infer a location within a radial distance of the given AP. When multiple APs can see the RSSI, then you can triangulate in real time to determine location. You can also take into account the recent history of the trajectory of motion, and the probability of future trajectories of motion. Many other blended combinations are possible, as are modal operations, when a system switches over to the most appropriate tracking technology for the situation (e.g. GPS is great outdoors but does not work well indoors).

In an example use case, a customer has three buildings for which they perform facilities maintenance. Each building was constructed independently by different construction companies, and was outfitted with different equipment, for example, lighting systems. When a customer walks into the first building and sees that he needs to replace some fluorescent lamps, the system knows the location of that building, detects that the customer is there, and allows his application, in this case, the Lamp Selection Guide, to operate in a mode optimized for the customer and his current location.

The Lamp Selection Guide has access to the local or remote database which has the mappings of lamps to location, and the Lamp Selection Guide uses this information to highlight only the products which are associated with that location. The products may be grayed out and selectable, grayed out and not selectable, or not displayed. The tables shown in FIGS. 8-10 show how the essential information may be organized in a database for use in the described system. Many other designs are possible.

In keeping with this example, when a user searches for replacement lamps in Building 1 (which uses only 25 different kinds of lamps), only the parameters corresponding to those 25 lamps are selectable in the selection guide interface during iterative parameter selections. This means that products can be located with the personalized, location-aware lamp selection guide much more quickly than with the complete lamp selection guide that displays the entire list of 5,000 lamps which the vendor sells. Thereafter, when the same customer moves to a different building (for example, Building 2), the lighting selection guide sees and recognizes Beacon 2, automatically asks for the list of lamps associated with that location, and displays only the list of 48 lamps that are installed in Building 2. The customer can move from building to building, and the lighting selection guide will present only the information the customer needs at each location.

Figure 21:
FIG. 21 illustrates a portion of a conventional selection guide.

By way of further example, FIGS. 21 and 22 shows how a selection guide application can limit user interaction to the products associated with a specific location. Note that the application also displays only the relevant product details associated with these products. For example, if a particular location only buys tube-shaped fluorescent lamps that emit blue light, the selection guide will not present options for selecting standard household lightbulbs, bulbs which emit yellow light, lamps with voltages not supported by the fluorescent products, or halogen bulbs. This kind of restriction on the user interface is particularly helpful when a selection guide uses a navigational or faceted search paradigm. FIG. 21 shows a portion of a complete selection guide having a non-location restricted set of options while FIG. 22 shows a portion of geo-aware selection guide having a location restricted set of option, e.g., for Building A.

In a further example, a large factory manufactures earth moving equipment. Different parts of the factory manufacture different pieces of equipment, and each part of the factory has a physical tool crib which stores parts consumed or used during the manufacturing process (e.g., drill bits and fasteners) at that location. Note that each manufacturing area has its own location tracking beacon (or network of beacons) which cover the range of the its corresponding manufacturing area. As a purchasing entity moves between tool cribs using a drill bit or fastener selection guide, only the parameters of the products which are used at each physical tool crib show up in the drill bit or fastener selection guide. If the Selection Guide App detects signals from multiple locations, the strongest signal will be selected. In addition, the location tracking system will implement error correction mechanisms that prevent momentary glitches or jitter in the location tracking.

In a further example, the system can use the mobile device's compass, acceleration data, and/or prior travelling trajectory to discern a direction within a room or building. For example, the north side of a tool crib could have lighting products in it, the south side, machine lubricants, the east side small tool supplies like drill bits, and the west side, widgets. When a person enters the room with the appropriate selection guide app, the selection guide app detects the orientation of the device and the probable direction that the person is facing. Then, the selection guide can present the objects associated with the direction of orientation within the room or building as illustrated below. Note that the application performing the search can be something like the selection guide we use in this example, or a more general search engine. Note that when the user faces different directions, the system may respond by running different applications or by restricting the interactions allowed by default in an existing application. For example, when the user faces north, the system could run a specialized lighting selection guide. In contrast, when the user faces east, the system could instead run a more generalized selection guide (and limit the selection options available to the user to the relevant lubricants) because the number and complexity of available lubricants is smaller and lower.

In a further embodiment, a purchasing manager may want to buy fasteners for each tool crib in a large factory. The purchasing manager can select a geo-location from a list and simulate being physically present at each location, each geo-location parameter selected causing the selection guide to launch and act as if the purchasing manager were physically present at a given location.

In some cases, the user might want to select products associated with more than one beacon, or location. For example, a factory has specialized tool cribs for 3 different operations (Operations A, B, and C with corresponding Tool Cribs A, B, and C), but stocks common items in a shared tool crib (Tool Crib D). In this case, a user in the Operation A section of the factory would want to see items stocked in both Tool Cribs A and D. In this scenario, the range of Beacon D covers the entire factory, and is associated with the tools which are stocked in Tool Crib D, and are available to all operations. When a user enters Section B of the factory, the system will display products and product options which are associated with both Beacons B and D.

In a still further example illustrated below, a customer service representative services multiple locations. To simplify and personalize the selection guide to the customer service representative, the customer representative may either wear a beacon, or can carry a device which is has built-in beacon transmission capability. In the event that the user wears a beacon, the selection guide detects the wearable beacon tag, along with any other beacons in the environment. The system associates this mobile tag with a specific person or role, and in turn, with preferred products/selections and product/selection options in the data store. This way, a user's selection guide can present options personalized with both users and locations.

In the event that the user's device is equipped with beacon transmission capability, then any listening applications in the environment will know who has entered the space, and in what role they are present. The system can determine a user's role by mapping the combination of the identity of the mobile beacon, the application which is running on the device carrying the beacon, and the user's location. For example, the system can infer that a customer service representative running the Lighting Selection Guide who is present in a tool crib is there to take inventory and/or replenish the lighting stock in the tool crib, and can present information and make service requests accordingly.

While various embodiments of the invention have been described in detail, it will be appreciated by those skilled in the art that various modifications and alternatives to those details could be developed in light of the overall teachings of the disclosure. For example, while described in the context of lists of product, it will be appreciated that the geographically based lists of items could be lists of services, e.g., a list of renewable warranty services for product at a given geographical location, a list of preferred service technicians for product at a given geographical location, etc., and/or other information such as images of product, product installations, etc., notes, inventory in the vicinity of a given geographical locations, and the like without limitation. In addition, the system can operate in "blended" mode, with mobile and stationary beacons in the environment. In such a system, an application can both listen for beacons in the environment and announce its presence to others. Furthermore, the described embodiments are not intended to be viewed in isolation and one or more aspects of the described embodiments can be used together as needed for any particular purpose. Accordingly, the particular arrangements disclosed are meant to be illustrative only and not limiting as to the scope of the invention which is to be given the full breadth of the appended claims and any equivalents thereof.

What is claimed is:

1. A method for using a mobile device to provide access to at least one list of product related items, comprising:
   determining a geographic location of the mobile device;
   causing a selection guide to be presented on the mobile device, the selection guide comprising a plurality of selectable entries each for use in specifying a characteristic of a product;
   using the determined geographic location to inhibit the use of one or more of the plurality of selectable entries of the selection guide;
   receiving from the selection guide a specification of one or more characteristics of a product of interest, the one or more characteristics of the product of interest being provided via use of a corresponding one or more of the plurality of selectable entries of the selection guide the use of which were not caused to be inhibited;
   using the specified one or more characteristics to retrieve from a data store information related to at least one product; and
   causing the mobile device to display in a user interface the information related to the at least one product.

2. The method as recited in claim 1, wherein the mobile device determines a geographic location of the mobile device via use of data obtained from a GPS satellite system.

3. The method as recited in claim 1, wherein the mobile device determines a geographic location of the mobile device via use of data obtained from one or more signaling beacons.

4. The method as recited in claim 1, wherein the one or more of the plurality of selectable entries of the selection guide are inhibited by being removed from the selection guide.

5. The method as recited in claim 1, wherein the one or more of the plurality of selectable entries of the selected guide are inhibited by making the one or more of the plurality of selectable entries non-interactive.

6. The method as recited in claim 1, further comprising determining an orientation of the mobile device at the determined geographic location of the mobile device and using the determined orientation of the mobile device and the determined geographic location to inhibit the use of one or more of the plurality of selectable entries of the selection guide.

7. The method as recited in claim 6, wherein the mobile device determines a geographic location of the mobile device via use of data obtained from a GPS satellite system.

8. The method as recited in claim 6, wherein the mobile device determines a geographic location of the mobile device via use of data obtained from one or more signaling beacons.

9. The method as recited in claim 6, wherein the one or more of the plurality of selectable entries of the selection guide are inhibited by being removed from the selection guide.

10. The method as recited in claim 6, wherein the one or more of the plurality of selectable entries of the selected guide are inhibited by making the one or more of the plurality of selectable entries non-interactive.

11. The method as recited in claim 1, further comprising determining an identity of a user of the mobile device at the determined geographic location of the mobile device and using the determined identity of the user of the mobile device and the determined geographic location to inhibit the use of one or more of the plurality of selectable entries of the selection guide.

12. The method as recited in claim 11, wherein the mobile device determines a geographic location of the mobile device via use of data obtained from a GPS satellite system.

13. The method as recited in claim 11, wherein the mobile device determines a geographic location of the mobile device via use of data obtained from one or more signaling beacons.

14. The method as recited in claim 11, wherein the one or more of the plurality of selectable entries of the selection guide are inhibited by being removed from the selection guide.

15. The method as recited in claim 11, wherein the one or more of the plurality of selectable entries of the selected guide are inhibited by making the one or more of the plurality of selectable entries non-interactive.

* * * * *